March 18, 1930. E. E. CAMPBELL 1,751,441
HEATER VALVE
Filed July 28, 1927
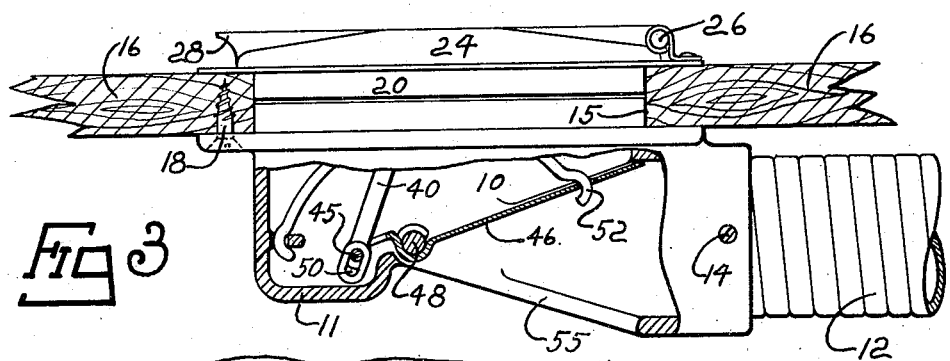
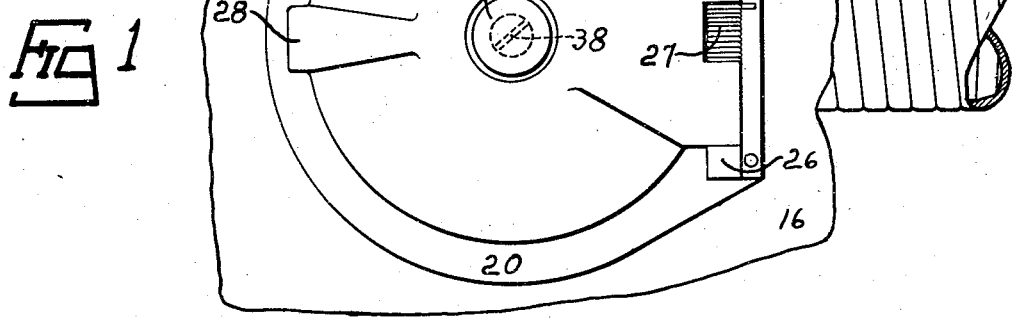
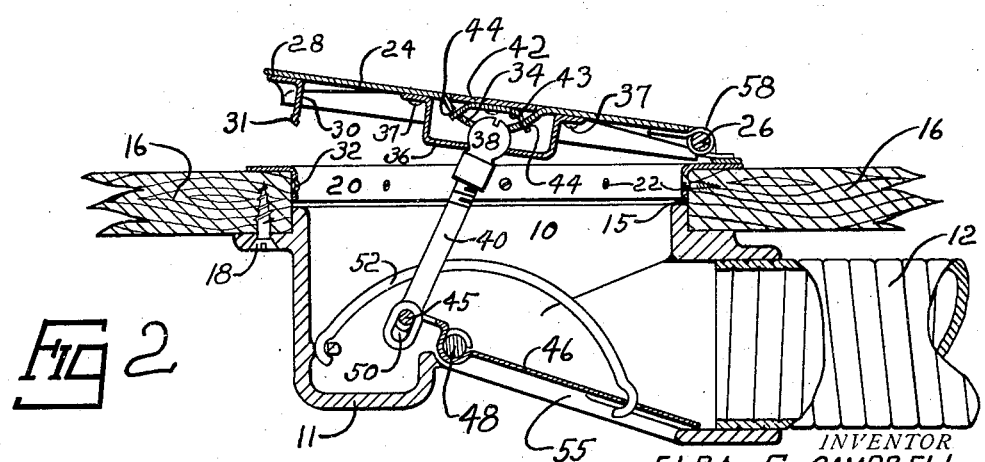
INVENTOR
ELBA E. CAMPBELL
BY
Jhing Harness
ATTORNEY Patented Mar. 18, 1930

1,751,441

UNITED STATES PATENT OFFICE

ELBA E. CAMPBELL, OF DETROIT, MICHIGAN, ASSIGNOR TO CHRYSLER CORPORATION, OF HIGHLAND PARK, MICHIGAN, A CORPORATION OF DELAWARE

HEATER VALVE

Application filed July 28, 1927. Serial No. 208,919.

This invention relates to a bypass valve for the heating air duct of an automotive vehicle body heating system.

More specifically the invention consists in providing a valve in the end of a heater pipe that is operated by the raising or lowering of a cover over the opening of the heater pipe leading into the vehicle body.

One of the primary objects of my invention is to provide a means for controlling a bypass valve within a pipe by movement of a cover over the end of said pipe.

A further object is to provide a means for allowing the bypass valve to snap into open or closed position by a uniform movement of the cover that controls the movement of the said valve.

Other objects are to provide a means of adjustment between the valve and the controlling cover and also a means for preventing the cover from rattling.

These and further objects are more fully explained in the following specification taken in connection with the drawings in which:

Fig. 1 is a plan view of my invention.

Fig. 2 is a sectional view thru the center of Fig. 1 showing the cover in open position.

Fig. 3 is a side elevation, partly in section, of my invention showing a closed position.

Referring to the drawings, there is shown a heater valve housing 11. A pipe 12 is secured within an opening in the housing 11 by a screw 14. It is to be understood that there is a means for heating air and that the pipe 12 acts as a conduit for the transference of the resultant warm air from said means to a chamber 10 in the valve housing 11.

The housing 11 is secured within an opening 15 in the vehicle body floor 16 by screws 18. A bezel 20 is secured in the opening 15 above the housing 11 by screws 22. A cover 24 is provided for the opening and is secured to the bezel 20 by a hinge 26. A spring 27 is provided on the hinge 26 of the cover 24 to keep the latter from rattling. The cover 24 is provided with a lip 28 so that it may be raised easily. Secured beneath the lip 28 is a projecting prong 30 having a bent end 31, which, when the cover 24 is down, springs into a hole 32 in the bezel 20 and acts as a catch for holding the cover 24 closed. The central portion of the cover 24 is depressed as at 34. Clamped between the depression 34 and a cup shaped retainer 36, which is riveted to the cover 24 by rivets 37, is a ball and nut member 38 which acts as a ball and socket joint for a rod 40 which is screwed into the threaded portion of the member 38. The top of the spherical part of the member 38 is slotted to receive a screw driver blade for the purpose of adjustment.

In order that the cover 24 may be flush on top the depression 34 is covered with a disc 42 which is easily removable to permit access to the slotted ball 38. The disc 42 has a spring 43, riveted to its under surface, which projects thru two holes 44 in the depression 34 and holds the disc 42 flush with the top surface of the cover 24. The lower end of the rod 40 is connected to a plate valve 46 which is pivoted on a shaft 48 in the housing 11. The connection between the rod 40 and the valve 46 consists of a pin 45, carried by a projection on the valve 46, received in a slot 50 at the lower end of the rod 40.

An over center spring 52 serves to snap the valve 46 into either closed or open position and the slot 50 in the rod 40 permits the pin 45 to move freely without causing any corresponding snapping movement of the cover 24. When the cover 24 is raised so as to allow warm air to enter the car body from the chamber 10, the rod 40 is also raised, the bottom of the slot 50 engages the pin 45 on the valve 46 and moves the valve until the two ends of the spring 52 are in line with the shaft 48 at which time the spring 52 will contract and snap the valve 46 down and cover the opening 55 thereby directing warm air from the pipe 12 up thru the opening 15.

When the cover 24 is closed it is desirable to prevent the warm air from entering the chamber 10 so that the cover 24 may be kept cool when not in use.

In closing the cover 24 the rod 40 pushes directly against the pin 45 in the slot 50 thereby moving the valve 46 up until the two ends of the spring 52 are in line with the shaft 28. When the spring ends are out of line with the shaft 48 the spring will contract causing the valve 46 to move upwardly with a snap closing the opening of the pipe 12 into the chamber 10. The passage 55 is then open so that warm air from the pipe 12 may be diverted away from the chamber 10, keeping the housing 11 and cover 24 as cool as possible when warm air is not required in the vehicle body.

The bezel 20 is spaced from the housing 11 so that there is no conduction of heat through engaged metallic parts. The only metallic connection between the cover and the housing 11 is the operating connection or rod 40 through which the conduction of heat from the housing 11 is negligible.

The opening 15 is preferably annular and the ball 38 is located in the center of the cover so that the heater opening or pipe 12 may be swung from one position to another without moving the position of the bezel and cover. This is a feature particularly desirable for making one style heater for different model automobiles.

It will be readily seen that altho the valve 46 is snapped open or closed the slot 50, in which the pin 45 moves, prevents this snapping action from being transmitted to the cover 24 permitting the cover to be raised or lowered smoothly.

It will be obvious that various changes may be made in the arrangement, combination and construction of the various parts of my improved device without departing from the spirit of my invention and it is my intention to cover by my claims such changes as may be reasonably included within the scope thereof.

What I claim is:

1. A heater chamber having an inlet and two outlet openings, a cover for one outlet opening, a valve positioned between the other outlet opening and the inlet opening so as to divert air thru one by closing the other, an adjustable rod connecting said cover and said valve and a slot in said rod at said valve connection to allow the valve freedom of movement independent of said cover.

2. A heater chamber having an inlet and two outlet openings, a cover for one outlet opening, a valve positioned between the other outlet opening and the inlet opening, an over-center spring adapted to urge said valve in a position for closing the last named outlet opening or to close the communication between said inlet opening and the first named outlet opening, and a connection between said cover and said valve.

3. A heater chamber having an inlet and an outlet opening, a cover for said outlet opening, a valve for said inlet opening, an over-center spring adapted to urge said valve in either open or closed position, and adjustable means forming a lost motion connection between said cover and said valve for closing the latter by closing said cover.

4. A heater chamber having an inlet and an outlet opening and a bypass opening, a cover for said outlet opening, a valve adjacent said inlet and bypass opening for diverting air out said bypass opening or into said chamber, a spring acting on said valve to resiliently urge it in either position, and a lost motion connection between said cover and said valve.

5. A heater chamber having an inlet and an outlet opening, a valve for said inlet opening, a cover for said outlet opening, an over-center spring adapted to urge said valve in open or closed position, and a lost motion connection between said cover and said valve.

6. A heater chamber having an inlet and an outlet opening, a valve for said inlet opening, a cover for said outlet opening, a spring adapted to urge said valve in open or closed position, and a link having a universal connection to said cover and a lost motion connection to said valve.

7. A heater chamber having an inlet and an outlet opening, a cover for said outlet opening, a valve adjacent said inlet opening, and a connection between said cover and valve for controlling the movement of said valve by the movement of said cover, said connection being secured to said cover centrally and by a universal join connection to permit angular movement of said cover with respect to said valve.

ELBA E. CAMPBELL.